(12) United States Patent
Kikukawa et al.

(10) Patent No.: US 6,515,952 B1
(45) Date of Patent: Feb. 4, 2003

(54) OPTICAL RECORDING METHOD

(75) Inventors: Takashi Kikukawa, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/456,301

(22) Filed: Dec. 8, 1999

(30) Foreign Application Priority Data

Dec. 9, 1998 (JP) .......................................... 10-368539
Oct. 25, 1999 (JP) .......................................... 11-303047

(51) Int. Cl.$^7$ .............................................. G11B 7/00
(52) U.S. Cl. .................................... 369/59.12; 369/116
(58) Field of Search .......................... 369/275.3, 275.4, 369/59.11, 59.12, 59.2, 59.23, 100, 59.15, 13.24, 13.25, 13.26, 13.54, 116

(56) References Cited

U.S. PATENT DOCUMENTS

| | | | |
|---|---|---|---|
| 5,610,897 A | * | 3/1997 | Yamamoto et al. |
| 5,625,388 A | * | 4/1997 | Maeda et al. |
| 5,732,062 A | * | 3/1998 | Yokoi et al. |
| 5,737,901 A | | 4/1998 | Miyamoto et al. |
| 6,154,437 A | * | 11/2000 | Utsunomiya et al. |

FOREIGN PATENT DOCUMENTS

| | | |
|---|---|---|
| DE | 43 33 003 | 3/1994 |
| EP | 0 724 259 | 7/1996 |
| JP | 63-81631 | 4/1988 |
| JP | 8-267926 | 10/1996 |
| JP | 9-7176 | 1/1997 |
| JP | 11-232697 | 8/1999 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

The present invention has enabled to solve various problems associated with the optical recording medium of phase change type when high density recording is conducted by reducing the record marks. Provided is an optical recording method for an optical recording medium having a recording layer of phase change type wherein amorphous record marks are formed in the recording layer by irradiating the medium with a recording beam which is power-modulated between high power and low power. In this method, minimum record marks are formed such that at least a part of the rear end protrudes toward the forward end of the mark.

14 Claims, 10 Drawing Sheets

RECORDING/READING BEAM

FIG. 10

RECORDING/READING BEAM

OPTICAL RECORDING METHOD

BACKGROUND OF THE INVENTION

1. Field of the Invention

This invention relates to a method for recording an optical recording medium of phase change type.

2. Prior Art

Highlight is recently focused on optical recording media capable of recording information at a high density and erasing the recorded information for overwriting. One typical overwritable optical recording medium is phase change optical recording medium wherein a laser beam is directed to the recording layer to change its crystalline state whereupon a change in reflectance by the crystallographic change is detected for reading of the information. The phase change optical recording media are of great interest since the medium can be overwritten by modulating the intensity of a single laser beam and the optical system of the drive unit is simple as compared to magnetooptical recording media.

Most optical recording media of phase change type used chalcogenide systems such as Ge—Te system and Ge—SB—Te system which provide a substantial difference in reflectance between crystalline and amorphous states and have a relatively stable amorphous state. It was also recently proposed to use new compounds known as chalcopyrites. Chalcopyrite compounds have been investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No.4 (1988), pp. 228. Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai Nos. (JP-A) 240590/1991, 99884/1991, 82593/1991, 73384/1991, and 151286/1992. In addition to the optical recording media of phase change type wherein chalcopyrite compounds are used, optical recording media of phase change type wherein AgSbTe$_2$ phase is formed with the crystallization of the recording layer is disclosed in JP-A 267192/1992, 232779/1992, and 166268/1994.

When information is recorded on the optical recording medium of phase change type, the entire recording layer is first brought into crystalline state, and then, a laser beam of high power (recording power) is applied so that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallization temperature and lower than the melting temperature. The record mark to which the laser beam of erasing power is applied is heated to a temperature higher than the crystallization temperature and then allowed to slowly cool to recover the crystalline state. Accordingly, in the optical recording media of the phase change type, the medium can be overwritten by modulating the intensity of a single light beam.

In general, recording density of optical recording media including optical recording media of phase change type can be increased to a level higher than that of magnetic recording media. Today, further increase in the recording density is demanded for processing an enormous amount of information as in the case of image processing. Recording density per unit area can be increased by reducing the record mark length, by reducing the interval between the adjacent tracks, and by reducing the interval in the track direction between the adjacent record marks.

However, when the record mark length is reduced, sufficient signal output is not attained, and consequently, C/N will be reduced. The recording medium will also have a narrow recording power margin. Stable formation of the record marks at a predetermined length will also become difficult to result in an increased jitter.

SUMMARY OF THE INVENTION

In view of the situation as described above, an object of the present invention is to solve the problems associated with the high density recording at a reduced record mark length.

Such objects are attained by the present invention as described in (1) and (4), below.

(1) An optical recording method for an optical recording medium having a recording layer of phase change type wherein amorphous record marks are formed in the recording layer by irradiating the medium with a recording beam which is power-modulated between high power and low power, wherein minimum record marks are formed such that at least a part of the rear end protrudes toward the forward end of the mark.

(2) An optical recording method according to the above (1) wherein the rear end shape of the record mark protruding toward the forward end is formed by crystallizing the region that has been melted by the irradiation of the recording beam.

(3) An optical recording method according to the above (1) or (2) wherein the minimum record marks are formed such that:

$$M_L \leq 0.4\lambda/NA$$

when $M_L$ is length of minimum record marks, $\lambda$ is wavelength of the recording beam, and NA is numerical aperture of objective lens of recording optical system.

(4) An optical recording method according to any one of the above (1) to (3) wherein the minimum record marks are formed such that:

$$M_W/M_L > 1$$

when $M_W$ is width of minimum record marks and $M_L$ is length of minimum record marks.

DETAILED DESCRIPTION OF THE INVENTION

Figure 1:
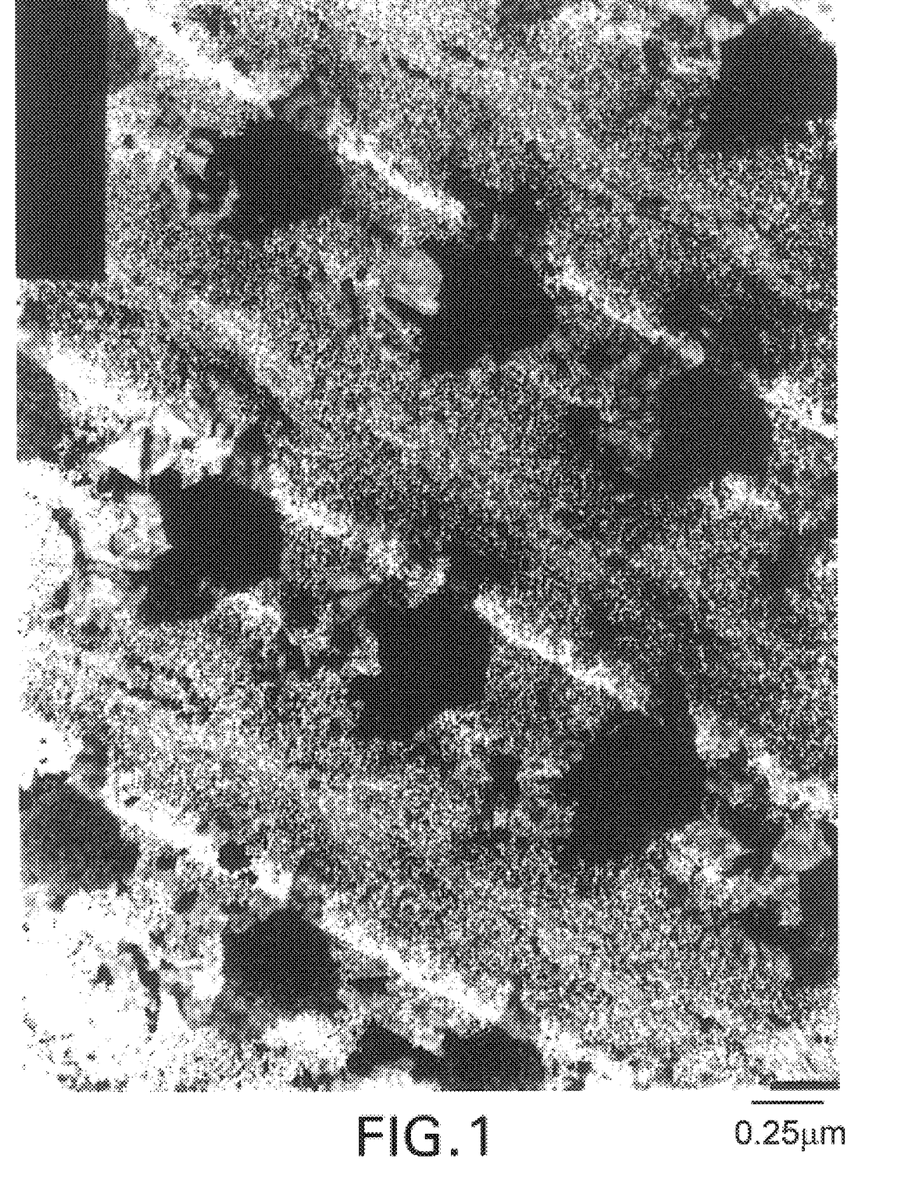
FIG. 1 is a photomicrograph taken by a transmission electron microscope of a recording layer of phase change type containing Ag, In, Sb and Te as its main components. This photograph is presented as a substitute for a diagram showing crystalline structure.
Figure 2:
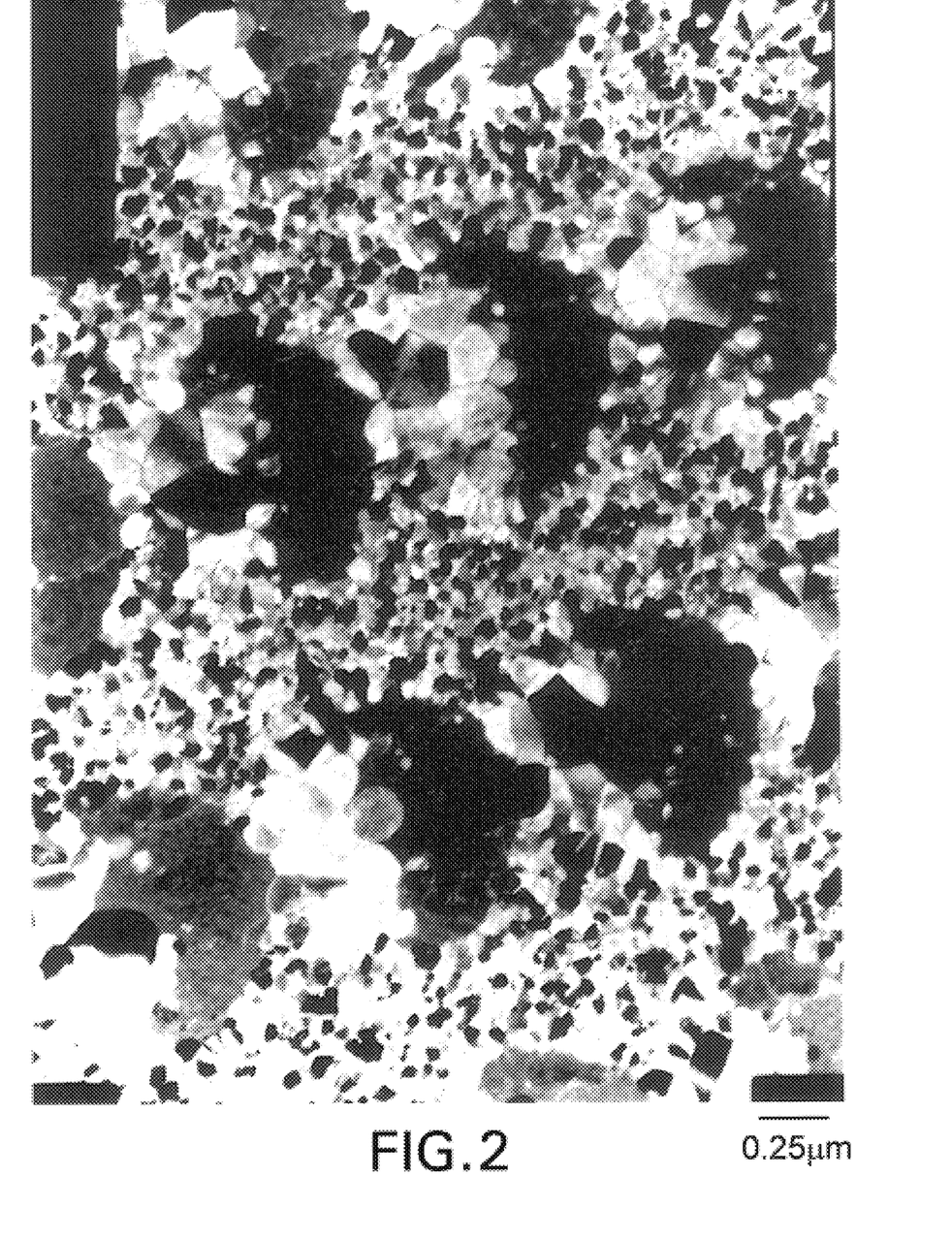
FIG. 2 is a photomicrograph taken by a transmission electron microscope of a recording layer of phase change type comprising Ge$_2$Sb$_2$Te$_5$. This photograph is presented as a substitute for a diagram showing crystalline structure.

FIGS. 1 and 2 are respectively photomicrographs taken by a transmission electron microscope (TEM) of the recording layers of phase change type wherein record marks of 250 nm long are formed. The recording layer in FIG. 1 contains Ag, In, Sb and Te as its main components, and the recording layer in FIG. 2 comprises $Ge_2Sb_2Te_5$. The "record mark length" used herein is the value determined from the linear velocity of the medium and the recording frequency. The dark colored regions regularly appearing in the figures are the record marks. In FIG. 1, the upper left side of the record mark is the rear end, while the lower left side of the record mark is the rear end in FIG. 2. It should be noted that these record marks were formed by moving the laser beam from the side of the forward end of the record mark to the side of the rear end of the record mark.

In the present invention, the record marks are preferably formed such that at least a part of the rear end of the record mark protrudes toward the forward end of the record mark as shown in FIGS. 1 and 2. It should be noted that not all of the record marks are required to have such contour, but at least the minimum record marks should have such contour.

Figure 7:
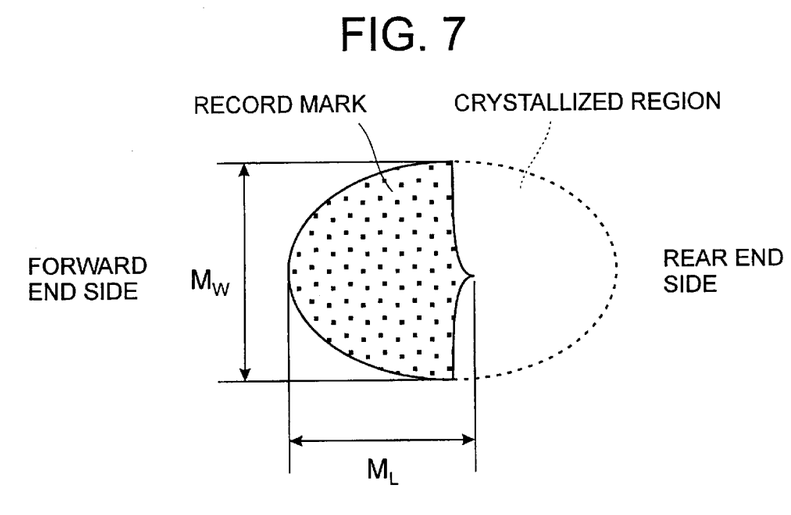
FIG. 7 is a schematic view showing the record mark.

FIG. 7 is a schematic view showing the record mark. By forming the record mark in such shape, width $M_W$ of the minimum record mark can be increased beyond the length $M_L$ of the minimum record mark. It should be noted that $M_W/M_L$ is preferably at least 1.1. In a recording medium of phase change type, the signal is read as a difference in the reflectance between the amorphous record marks and crystalline regions other than the record marks, and a record mark having a larger width $M_W$ will result in a higher signal output if the record marks have the same length $M_L$. Accordingly, signal output of sufficient level can be attained in the present invention even if the minimum record mark length is reduced to thereby increase the linear recording density. However, an excessively high $M_W/M_L$ is likely to result in an increased cross erase wherein the record marks on the adjacent track are erased or an increased cross talk wherein the record marks on the adjacent track are read out. In view of such situation, the $M_W/M_L$ is preferably up to 4, and more preferably up to 3.

Next, the method adopted to form the record marks having the rear end of the shape as described above, and the reason why the relation $M_W>M_L$ can be satisfied by the adoption of such method are described.

As described above, the optical recording medium of phase change type is recorded by irradiating the medium with a laser beam modulated at least between the recording power and the erasing power. When the medium is irradiated by the laser beam at the recording power, the region of the recording layer irradiated by the laser beam melts. The power of the laser beam is maintained for the duration corresponding to the record mark length, and then reduced to the erasing power so that the molten region is rapidly cooled to become amorphous. In the course of the record mark formation as described above, a record mark having the rear end of the shape as described above can be formed by amorphousizing not all of the molten region and allowing some of the molten region to be crystallized. To be more specific, the rear end of the record mark is crystallized as shown in FIG. 7 by slowing down the cooling rate of the molten region in its rear end portion (which is the side of the laser beam destination). In the thus formed record marks, it is not likely that all of the rear end protrudes toward the forward end of the record mark, and the record marks typically has the shape as shown in FIG. 7 wherein a tail-like protrusion extending in the direction of the recording track is present at or near the center of the record mark rear end, for example, a shape like a bat with expanded wings.

Crystallization of some part of the molten region in the formation of the record marks is already described in JP-A 7176/1997. To be more specific, JP-A 7176/1997 describes that recrystallization takes place in the forward end of the record marks when the optical recording disc is operated at a low linear velocity, and suggests that such recrystallization may be prevented by irradiating the medium with a laser beam of recording power level in a pulse train of particular pattern. JP-A 7176/1997 also describes the mechanism of such crystallization. According to JP-A 7176/1997, the heat generated in the region corresponding to the rear half of the record mark by the irradiation of such region with the laser beam is conducted to the region corresponding to the front half of the record mark which has already been melted, and rapid cooling of such region is inhibited to result in the recrystallization of such region. The recrystallization caused by such mechanism described in the JP-A 7176/1997 is referred to as "self erase" in JP-A 232697/1999.

As disclosed in the patent documents as described above, it is known that the front end portion of the molten region may crystallize in the course of record mark formation by the "self erase", and that the shape of the front end portion of the record marks is influenced by such crystallization. However, as disclosed in JP-A 7176/1997, emphasis has been laid on the prevention of such influence of self erase on the record mark shape.

As opposed to such prior art, the rear end of the record marks can be formed in the shape as shown in FIGS. 1 and 2 when the phenomenon similar to such self erase is intentionally induced in the rear end portion of the molten region in order to crystallize the rear end portion of the molten region. The self erase phenomenon may be induced in the rear end portion of the molten region, for example, by controlling the power and duration of the laser beam irradiated to such region. The heat applied by the laser beam irradiated to such region is conducted in the rearward direction, and therefore, cooling rate of the rear end portion of the molten region can be regulated by controlling the power and the duration of the laser beam irradiation, and the length of the crystalline region in the rear end portion of the molten region is simultaneously regulated. When the self erase phenomenon is induced in the rear end portion of the molten region, crystallization mainly takes place in the lengthwise direction of the record mark, and scarcely in the width direction. Accordingly, a record mark having a width relatively longer than its length can be formed by forming a relatively wide record mark having a relatively long length corresponding to its width by the use of a recording power of a relatively high level, and thereafter, crystallizing the rear end portion of the molten region by self erase to thereby form the amorphous record mark of the predetermined length.

Next, the method employed in practice for regulating the self erase phenomenon in the rear end portion of the molten region is described.

Figure 8:
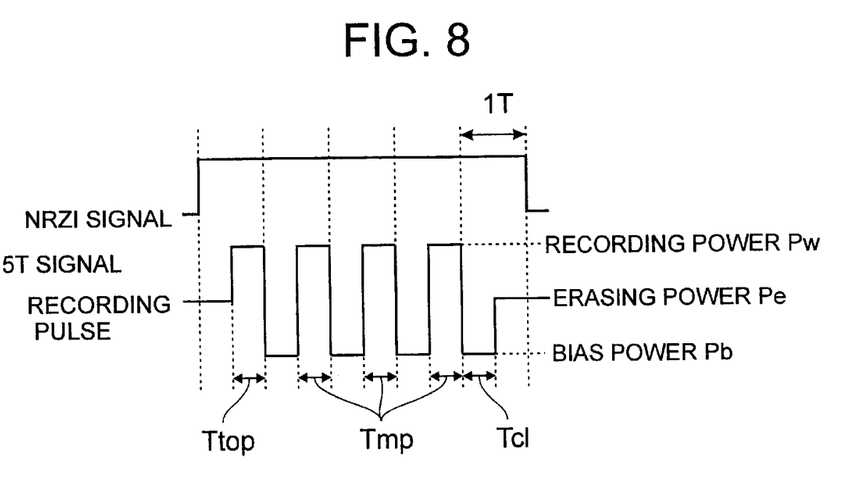
FIG. 8 is a schematic view showing an embodiment of the recording pulse strategy.

First, recording pulse strategy is described. An optical recording medium of phase change type is generally recorded, not by continuously irradiating the medium with the laser beam of the recording power for the duration corresponding to the length of the record mark, but by irradiating the medium by with the laser beam divided in a pulse train comprising a plurality of pulses for the control of the record marks as described in JP-A 7176/1997. Constitution of the pulse division is generally referred to as the recording pulse strategy. An embodiment of the recording pulse strategy is shown in FIG. 8 wherein a typical recording pulse train corresponding to 5T signal of NRZI signal is illustrated. In FIG. 8, $T_{top}$ represents width of the top pulse, $T_{mp}$ represents width of the pulses other than the top pulse (which are also referred to as multi-pulse), and $T_{cl}$ represents width of the downward pulse (also referred to as the cooling pulse) after the last pulse. Such pulse width is generally indicated by the value normalized with standard clock width (1T). In the recording pulse strategy shown in FIG. 8, power (bias power $P_b$) of all of the downward pulses including the cooling pulse is set at a value lower than the erasing power $P_e$.

When the power of the laser beam is modulated by the recording pulse strategy as described above, the self erase phenomenon in the rear end portion of the molten region can be regulated by controlling at least one of the recording power $P_w$, $T_{mp}$, power of the cooling power (bias power $P_b$ in the illustrated embodiment), $T_{cl}$ and the erasing power $P_e$. Although the control scheme may be adequately selected depending on the composition of the recording layer, the structure of the medium, and other factors relevant to the crystallization of the molten region, it is generally preferable to regulate at least one of the recording power $P_w$, the erasing power $P_e$, and $T_{cl}$.

In the present invention, the record mark length is regulated by the use of the self erase phenomenon, and therefore, flexibility in setting the record mark width is increased. For example, a wide record mark of the predetermined length can be formed by increasing both the recording power and the power after irradiating the record power (cooling pulse power and/or erasing power), namely, by melting a large area and increasing the area crystallized within the rear end portion of the molten area (see FIG. 3); while a narrow record mark of the predetermined length can be formed by reducing both the recording power and the power after irradiating the record power, namely by melting a small area and reducing the area crystallized within the rear end portion of the molten area (see FIG. 4). Therefore, a fully wide record mark extending beyond the recording track can be formed when either one of the guiding groove and the land between two adjacent guide grooves is used for the recording track, while a considerably wide track without extending beyond the recording track can be formed in the case of the land/groove recording wherein both the groove and the land are used for the recording tracks. A high signal output is thereby realized in both cases.

As described above, in the case of the present invention, record marks of the same length can be formed by adequately changing the power of the laser beam after irradiating the recording power even if the recording power was changed. In other words, flexibility in selecting the range of the recording power (recording power margin) for forming the record marks of predetermined length is increased in the present invention.

In contrast to such present invention, when the self erase phenomenon is not utilized for the formation of the rear end of the record marks, the rear end of the record marks formed will have a rounded shape like the front end of the record mark as shown in FIG. 2 of JP-A 7176/1997. When the length of the record mark is reduced in such a case, width of the record mark will be reduced simultaneously with the record mark length, and the area of the record mark will be insufficient to attain sufficient output. In addition, when the self erase phenomenon is not utilized, the record mark length will be substantially determined solely by the recording power and the recording power margin will be reduced.

Furthermore, jitter will be reduced by the use of the self erase phenomenon in the formation of the rear end of the record marks when compared to the case wherein circular or oblong record marks are formed. Such effect is particularly remarkable in the formation of the minimum record mark. Even if the record mark had a sufficient width, circular and oblong record marks suffer from increased jitter compared to the case wherein the self erase phenomenon is utilized in the formation of the rear end of the record marks. It is generally taken for granted in the art that a record mark with a highly symmetric contour with no indentation or protrusion results in the reduced jitter. It is the inventors of the present invention who have for the first time found that the jitter can be reduced by adopting the record mark of highly asymmetrical shape.

In the present invention, the record mark width can be increased in relation to the record mark length, and hence, decrease in the signal output by the decrease in the record mark length can be suppressed. Therefore, present invention is particularly effective when decrease in the minimum record mark length is required, and to be more precise, when the relation:

$$M_L \leq 0.4\lambda/NA$$

is required when $M_L$ is the minimum record mark length, $\lambda$ is the wavelength of the recording laser beam, and NA is the numerical aperture of the objective lens of the recording optical system. When the small record marks are formed without utilizing the self erase in the rear end portion of the molten region, the record marks formed will be circular or semi-circular, and the record mark width will be reduced to the extent equivalent to the record mark length, and the signal output will be accordingly reduced. The inventors of the present invention have found that the signal output is reduced beyond the critical level when the relation: $M_L \leq 0.4\lambda/NA$ is met. In contrast, in the present invention wherein the record mark width can be increased in relation to the record mark length, record marks with sufficient width can be formed even if the relation: $M_L \leq 0.4\lambda/NA$ is met and signal output of sufficient level can be thereby obtained.

The optical recording medium to which the present invention is applied is not limited for the material of the recording layer of phase change type. However, when the minimum mark length is short, to be more specific, when the minimum mark length is 350 nm or less, and in particular, 300 nm or less, the recording layer employed is preferably the one containing Ag, In, Sb and Te as its main components and desirably containing Ge and/or N as its sub component. By using the recording layer containing Ag, In, Sb and Te as its main components, deformation in the shape of the record marks associated with the minimum record marks of reduced length can be suppressed for the reason as described below.

As described above, FIG. 2 is a TEM photomicrograph of the recording layer comprising $Ge_2Sb_2Te_5$ wherein record marks of 250 nm long are formed, and FIG. 1 is a TEM photomicrograph of the recording layer containing Ag, In, Sb and Te as its main components wherein record marks of the same length are formed. In FIG. 2, coarse crystal grains having a diameter almost to reach half of the record mark length are found. The size and number of such coarse crystal grains differ among marks, and it is clear that the record mark length of FIG. 2 greatly vary among marks. The diameter of the coarse crystal grains responsible for such record mark length variation is in the range of from tens to about a hundred nanometers, and therefore, formation of such coarse crystal grains gives considerable influence on the record marks of about 250 nm long. In addition, shape of the crystal grains in the rear region of the recorded marks are random, and therefore, the shape of the deformed record marks and the shift of the rear end position differ from mark to mark. The strategy of adjusting the record marks in their reading can not be adopted. The inventors of the present invention conducted experiments and found that critical increase in the jitter of the readout signal is induced in the recording layer having a Ge—SB—Te—based composition such as $Ge_2Sb_2Te_5$ when the record mark length is reduced to 350 nm or less, and in particular, to 300 nm or less. On the other hand, in the case of FIG. 1, although coarse crystal grains are also present near the rear end of the record marks as in the case of FIG. 2, such coarse crystal grains hardly affect the rear end shape of the record marks, and variation in the record mark length is minimal.

The coarse crystal grains near the rear end of the record marks in FIGS. 1 and 2 are those formed by crystallization of the rear end portion of the molten region. The small variation in the record mark length of FIG. 1 is believed to have been realized by the situation that, in the recording layer containing Ag, In, Sb and Te as its main components, crystallization occurs depending on the cooling rate distribution in the rear end portion of the molten region, and the crystallization terminates at the position where the cooling rate reaches the critical value for crystallization. In contrast, the large variation in the record mark length of FIG. 2 is believed to have been induced by the situation that crystallization in the recording layer of $Ge_2Sb_2Te_5$ proceeds and terminates beyond and before the position where the cooling rate reaches the critical value for crystallization once the crystallization has started in the region cooled at a slow rate.

The inventors of the present invention also found that thermal stability of the record marks critically reduces when the length of the record mark is reduced to 350 nm or less, and in particular, to 300 nm or less, and the resulting recording medium will be less reliable since the record marks are more likely to become crystallized during its storage under high temperature conditions. Such poor thermal stability of the small record marks may be improved by adding Ge and/or N to the recording layer containing Ag, In, Sb and Te as its main components. Addition of Ge and/or N results in the increase of the crystallization temperature as well as the activation energy of the recording layer, and high reliability is thereby realized.

When the atomic ratio of the main components constituting the recording layer containing Ag, In, Sb and Te as its main components is represented by the formula (I):

$$Ag_a In_b Sb_c Te_d \tag{I}$$

a, b, c, and d are preferably in the range of: $0.02 \leq a \leq 0.20$, $0.02 \leq b \leq 0.20$, $0.35 \leq c \leq 0.80$, and $0.08 \leq d \leq 0.40$; and more preferably, in the range of: $0.02 \leq a \leq 0.10$, $0.02 \leq b \leq 0.10$, $0.50 \leq c \leq 0.75$, and $0.10 \leq d \leq 0.35$.

If the value of a is too small in formula (I), recrystallization of the record marks, and hence, repetitive overwriting will become difficult. In contrast, if the value of a is too large, excess silver will solely diffuse into the antimony phase during the recording and erasure. This results in a reduced rewriting durability, less stability of both the record marks and the crystalline regions, and loss of reliability. Specifically, when the medium is stored at an elevated temperature, crystallization of the record marks will be promoted to invite drops of C/N and degree of modulation. In addition, the medium will undergo faster degradation in C/N and modulation degree in the repeated recording operations.

If the value of b is too small in formula (I), the record marks will become less amorphous to result in reduced degree of modulation and insufficient reliability. If the value of b is too large, reflectance of the regions other than the record marks will become reduced and the degree of modulation will be reduced.

If the value of c is too small in formula (I), difference in the reflectance created by the phase change will be sufficient, but erasure will be difficult due to markedly reduced rate of crystal transition. If the value of c is too large, the reflectance difference created by the phase change will be insufficient to invite drop in the degree of modulation.

If the value of d is too small, the recording layer will be difficult to render amorphous, and signal recording may become impossible. If the value of d is too large, crystal transition rate will be excessively low to render the erasure difficult.

Content of the germanium in the recording layer is preferably up to 25 at %, and more preferably up to 15 at %. When the germanium content is too high, properties of the Ag—In—Sb—Te-based recording material will not be fully realized. Germanium is preferably added in an amount of at least 1 at %, and more preferably in an amount of at least 2 at % in order to fully improve the stability in reading by the germanium addition.

JP-A 267926/1996 discloses an optical recording medium having a recording layer of phase change type represented by the formula:

wherein A is Ag and/or Au; B is Sb and/or Bi; C is Te and/or Se; D is In, or In and Al and/or P; and E is at least one element selected from Si, Ge, Sn, and Pb; and a, b, c, d, and e represent atomic ratio such that:

$0.001 \leq a \leq 0.20$, $0.40 \leq b \leq 0.90$, $0.10 \leq c \leq 0.50$, $a+b+c=1$, $0 \leq d \leq 0.06$, and $0.001 \leq e \leq 0.10$.

The recording layer of phase change type described in JP-A 267926/1996 and the optical recording medium of the present invention share the common features of including Ag, In, Sb and Te as the main components and the possibility of including Ge. The invention described in JP-A 267926/1996, however, attempts to realize a sufficient degree of erasure even when the medium is operated at a high linear velocity by the addition of element E which may be Ge, and this invention is different in this respect from the present invention. JP-A 267926/1996 is also silent about the critical improvement in the thermal stability of the small record marks of the length of up to 350 nm realized by the addition of Ge. As described in the Examples of the present invention, the thermal stability of the small record marks undergo a specific improvement by the addition of Ge. In contrast, the elements mentioned in JP-A 267926/1996 as being equivalent to Ge do not have the merit of improving the thermal stability of the small record marks.

Nitrogen may be introduced in the recording layer, for example, by conducting the sputtering of the recording layer in an atmosphere containing nitrogen in addition to the rare gas such as argon. Flow rate ratio of the atmospheric gas (nitrogen gas/rare gas) may be adjusted so that benefits of nitrogen addition is sufficiently realized while avoiding excessive introduction of the nitrogen gas. The ratio is preferably in the range of 2/150 to 8/150. When the flow rate ratio is too low, nitrogen content in the recording layer will be insufficient to realize the benefits of the nitrogen addition. In contrast, when the flow rate ratio is too high, nitrogen content in the recording layer will be too high and the reflectance difference created by the phase change will be reduced to result in the insufficient degree of modulation.

The recording layer may optionally contain elements other than the main components and the sub-components as described above. Such additional elements may be element M which is at least one element selected from H, Si, C, V, W, Ta, Zn, Ti, Ce, Tb, Sn, Pb and Y. The element M is effective for improving rewriting durability, and more specifically, for preventing loss of erasability as a result of repetitive rewriting operations. Of the elements as mentioned above, inclusion of at least one member selected from V, Ta, Ce, and Y is preferred because the effects are more outstanding. Content of the element M in the recording layer is preferably up to 10 at %. When the content of the element M is too high, the reflectance difference created by the phase change will be reduced to invite insufficient degree of modulation.

The recording layer preferably consists essentially of the elements as described above. However, it is acceptable that Ag is partially replaced by Au; Sb is partially replaced by Bi; Te is partially replaced by Se; and In is partially replaced by Al and/or P.

The percent replacement of Ag by Au is preferably up to 50 at %, and more preferably up to 20 at %. When the percent replacement is too high, the record marks are likely to crystallize, and loss of reliability at elevated temperature is invited.

The percent replacement of Sb by Bi is preferably up to 50 at %, and more preferably up to 20 at %. When the percent replacement is too high, the recording layer will have an increased absorption coefficient, and the optical interference effect will be reduced. This results in reduced difference in reflectance between the crystalline region and the amorphous region, and hence, in reduced degree of modulation as well as in the difficulty of realizing a high C/N.

The percent replacement of Te by Se is preferably up to 50 at %, and more preferably up to 20 at %. When the percent replacement is too high, crystal transition rate will be too slow and the erasability will be insufficient.

The percent replacement of In by Al and/or P is preferably up to 40 at %, and more preferably up to 20 at %. When the percent replacement is too high, record marks will become less stable to result in the loss of reliability. The proportion of Al and P is arbitrary.

As demonstrated by the fact that the shape at the rear end of the record mark is controlled by the crystal grains in FIG. 2, the present invention is also applicable to a medium having a Ge—Sb—Te-based composition such as $Ge_2Sb_2Te_5$. When the atomic ratio of the constituent elements is represented by the formula (II):

the Ge—SB—Te-based composition is preferably such that:

$0.08 \leq a \leq 0.35$, and $0.12 \leq b \leq 0.40$.

The recording layer is preferably formed to a thickness of 9.5 to 50 nm, and more preferably, to a thickness of 13 to 30 nm. When the recording layer is too thin, growth of the crystalline phase will be difficult and the reflectance difference created by the phase change will be insufficient. When the recording layer is too thick, the recording layer will have an increased heat capacity to render the recording difficult. An excessively thick recording layer also results in the reduced reflectance and in the reduced degree of modulation.

The composition of the recording layer may be identified by electron probe microanalysis (EPMA), X-ray microanalysis, ICP, etc.

The recording layer is preferably formed by sputtering. The sputtering conditions are not particularly limited. For example, when a recording layer comprising a material including two or more elements are to be formed, the sputtering may be conducted by using an alloy target, or alternatively, by multi-target sputtering wherein two or more targets are used.

Figure 9:
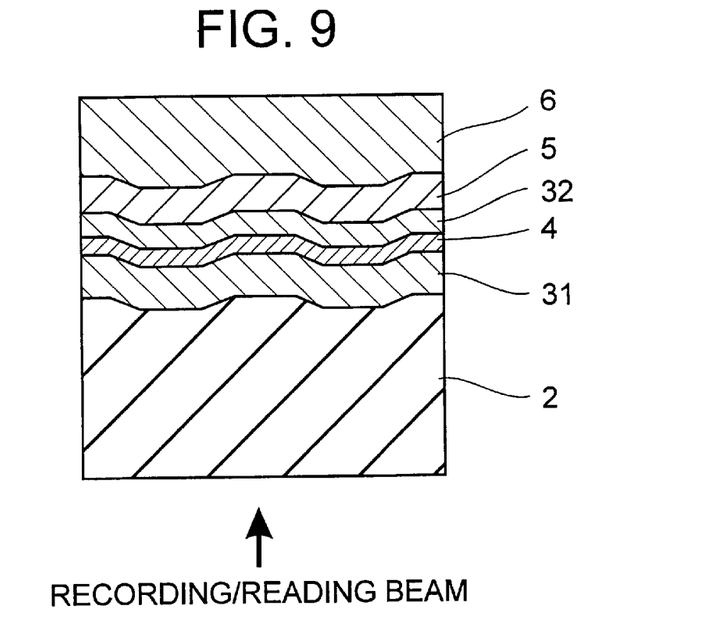
FIG. 9 is a cross sectional view of the optical recording medium according to an embodiment of the present invention.

A typical embodiment of the optical recording medium of phase change type comprises a substrate 2; and a first dielectric layer 31, a recording layer 4, a second dielectric layer 32, a reflective layer 5, and a protective layer 6 disposed on the substrate 2 in this order. In the medium of such embodiment, the recording/reading light is irradiated through the substrate 2.

Figure 10:
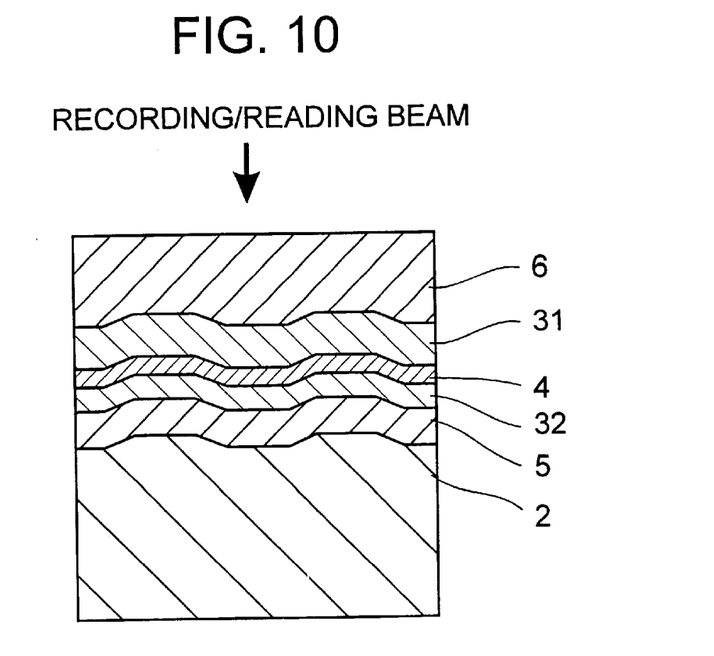
FIG. 10 is a cross sectional view of the optical recording medium according to another embodiment of the present invention.

The optical recording medium of the present invention may also have a constitution shown in FIG. 10. In the case of such constitution, the reading laser beam is irradiated without passing through the substrate 2, and in this case, the reflective layer 5, the second dielectric layer 32, the recording layer 4, the first dielectric layer 31, and the protective layer 6 are stack on the substrate 2 in this order.

The present invention is applicable not only to the rewritable optical recording medium of phase change type but also to the write-once type optical recording medium of phase change type. The write-once type medium is a recordable medium wherein the once formed record marks are unerasable. The term "unerasability" used herein does not mean that the medium is unerasable under all conditions but that the medium is recordable but unerasable (namely, the record marks are uncrystallizable) when the medium is subjected to an overwriting operation under the conditions the same as those of the rewritable medium (namely, at the same erasing power and the linear velocity). Such write-once type medium can be realized by forming the recording layer from a composition which is difficult to crystallize, for example, from a composition having a high crystallization temperature. Ordinary rewritable medium can be used as a write-once type medium by reducing the erasing power and/or by increasing the linear velocity of the medium.

EXAMPLES

Examples of the present invention are given below by way of illustration and not by way of limitation.

Example 1

Samples for evaluation were prepared by using a slide glass for the substrate 2, and forming a first dielectric layer, a recording layer, a second dielectric layer, and a reflective layer on the substrate 2 in this order.

The first dielectric layer was formed by sputtering in argon atmosphere using ZnS (80 mol %)—SiO$_2$ (20 mol %) for the target. The first dielectric layer was formed to a thickness of 80 nm.

The recording layer formed was the one containing the components as shown in Table 1 for the main components and the sub-components. The recording layer was prepared by sputtering in argon atmosphere or argon and nitrogen (N$_2$+Ar) atmosphere (in the case of nitrogen introduction) using Ag—In—Sb—Te alloy or Ag—In—Sb—Te—Ge alloy for the target. The atomic ratio of the main components was:

a=0.07, b=0.05, c=0.59, and d=0.29 in formula (I): Ag$_a$In$_b$Sb$_c$Te$_d$. The recording layer was formed to a thickness of 23 nm. Ge content of the recording layer is shown in Table 1. Flow rate ratio of the atmospheric gas (N$_2$/Ar) in the formation of the recording layer is also shown in Table 1.

The second dielectric layer was formed by sputtering in argon atmosphere using ZnS (50 mol %)—SiO$_2$ (50 mol %) for the target. The second dielectric layer was formed to a thickness of 25 nm.

The reflective layer was formed by sputtering in argon atmosphere using Al—1.7 at % Cr for the target. The reflective layer was formed to a thickness of 100 nm.

Evaluation

Crystallization temperature of the recording layer 4 was determined by placing the sample on a heating stage, irradiating the sample with the laser beam through the substrate 2 as the temperature is elevated at 30° C./min, and measuring the temperature of the reflectance change. The samples were also evaluated for increase in activation energy by the addition of Ge to the Ag—In—Sb—Te layer through measurement of the activation energy of the recording layer by Arrhenius method. The results are shown in Table 1.

TABLE 1

| Sample No. | Main Components | Sub-Component | Ge content (at %) | N$_2$/Ar | Crystallization temp. (° C.) | Activation energy (eV) |
|---|---|---|---|---|---|---|
| 1 | Ag—In—Sb—Te | — | — | — | 175.5 | 3.15 |
| 2 | Ag—In—Sb—Te | Ge | 2 | — | 185 | 3.41 |
| 3 | Ag—In—Sb—Te | Ge | 5 | — | 201 | 4.59 |
| 4 | Ag—In—Sb—Te | Ge | 10 | — | 231 | 4.95 |
| 5 | Ag—In—Sb—Te | N | — | 5/150 | 193.5 | — |
| 6 | Ag—In—Sb—Te | N | — | 10/150 | 207 | — |

As shown in Table 1, addition of Ge or N as the sub-component results in the increase of crystallization temperature, and addition of Ge as the sub-component, is also associated with the increase in the activation energy.

It should be noted that the reflectance difference (difference between the reflectance in crystalline state and the reflectance in amorphous state) was 3.6% when the recording layer was formed in the atmosphere free from N$_2$, while the reflectance difference was 3.1% at N$_2$/Ar of 5/150 and 2.3% at N$_2$/Ar of 10/150. It was thus confirmed that addition of N to the recording layer results in the decrease of modulation degree.

Example 2

A substrate 2 in the form of a disc having a diameter of 120 mm and a thickness of 0.6 mm was prepared by injection molding polycarbonate. Grooves were simultaneously formed in the injection molding of the substrate 2. On the grooved surface of the substrate 2, there were formed a first dielectric layer, a recording layer, a second dielectric layer, and a reflective layer in this order by the procedure as described for the evaluation sample Nos. 1 to 6 in Example 1 to produce optical recording disk sample Nos. 1 to 6.

The recording layer of the thus produced sample was initialized (crystallized) by a bulk eraser and the sample was placed on an optical recording medium evaluator. The sample was overwritten under the conditions as described below:

Laser beam wavelength: 638 nm

Numerical aperture, NA: 0.6

Linear velocity: 3.5 m/s

Recorded signal: single signal corresponding to the record mark length of 250 nm. The recording pulse strategy was of the pattern shown in FIG. 4 wherein:

T$_{top}$: T$_{mp}$: T$_{cl}$=0.5: 0.3: 0.5,

Number of multi-pulse=1,

P$_w$=11.0 mW,

P$_e$=5.0 mW, and

P$_b$=0.5 mW.

The sample was then stored in the environment of 80° C. and 80% RH for 100 hours.

Average reflectance of the track formed with the record marks was measured before and after the storage to find the alteration in the reflectance. If the record marks crystallize during the high temperature storage, the average reflectance will be altered. For comparison purpose, a medium recorded with the single signal corresponding to the record mark length of 620 nm was measured for the reflectance in the same manner except that reflectance at the record mark and not the average reflectance of the track was measured in. the case of the record mark length of 620 nm. At the record mark of 620 nm, reflectance alteration was found in no sample while reflectance alteration was noted in Sample No. 1 having the sub-component-free recording layer when the record mark length was 250 nm.

When the record mark length was reduced to 150 nm, and the samples were measured after storing at 80° C. and 80% RH, Sample No. 1 exhibited reflectance alteration after storing for 50 hours while other samples exhibited no reflectance alteration after storing for 100 hours.

A photomicrograph of Sample No. 2 after forming the record marks of 250 nm long taken by a transmission electron microscope of is shown in FIG. 1. A photomicrograph was also taken by a transmission electron microscope for a sample having the record marks of 250 nm long formed thereon which had been prepared as in the case of the above-described samples except that the composition of the recording layer was $Ge_2Sb_2Te_5$, and the photomicrograph is shown in FIG. 2. It should also be noted that, in the sample shown in FIG. 2, the recording pulse strategy was such that:

$T_{top}$: $T_{mp}$: $T_{cl}$=0.5: 0.22: 0.5 and other recording conditions were the same as those of the sample of FIG. 1.

Comparison of FIG. 1 with FIG. 2 revealed that the record marks are less deformed in the Ag—In—Sb—Te-based recording layer. As in the case of FIG. 1, the contour of the record mark rear end was not greatly affected by the coarse crystal grains in the Sample Nos. 1 and 3 to 6 shown in Table 1.

It should be noted that $M_W/M_L$ was 1.8 or more in FIG. 1, and 2.2 or more in FIG. 2.

Example 3

Figure 11:
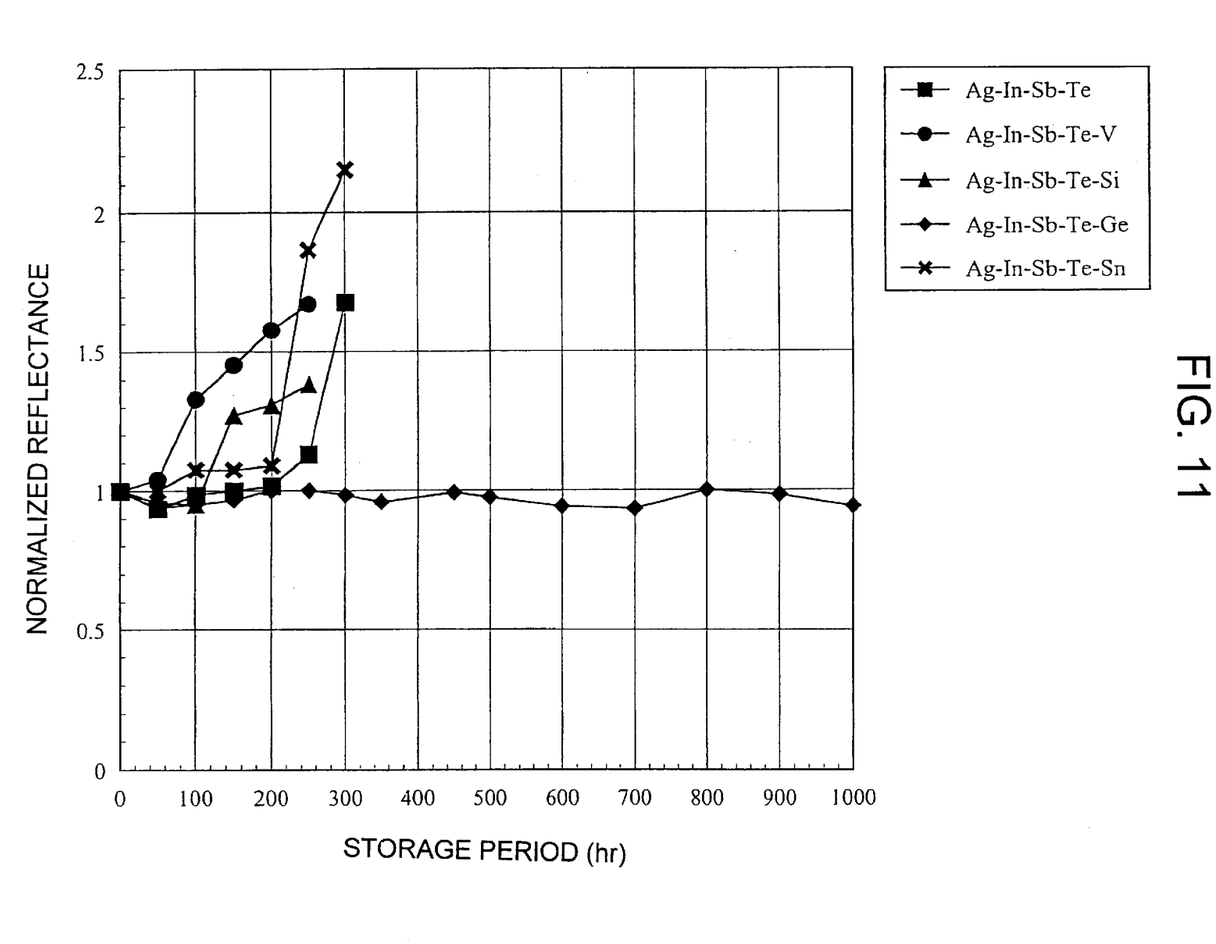
FIG. 11 is a graph showing normalized reflectance of the optical recording medium in relation to the storage period of the medium under high temperature, high humidity conditions.

Sample No. 3 produced in Example 2 was formed with record marks of 300 nm long by repeating 10 overwriting operations, and the recorded sample was stored under high temperature, high humidity conditions of 80° C. and 80% RH to evaluate the relation between the reflectance and the storage period. It should be noted that the reflectance measured was the reflectance at the record mark. For comparison purpose, samples having a recording layer containing the elements mentioned as being equivalent to Ge (namely, Si or Sn) in J?-A 267926/1996 were also produced, and these samples were also evaluated for the relation between the reflectance and the storage period. The results are shown in FIG. 11. The "normalized reflectance" in the vertical axis of FIG. 11 is the reflectance normalized by the reflectance before the storage.

As demonstrated in FIG. 11, the recording layer having the elements other than Ge added thereto exhibited a steep increase in the reflectance before storing for 300 hours to indicate the crystallization of the record marks. In contrast, no substantial increase in the reflectance was noted after passing 1000 hours when the recording layer had Ge added thereto. The advantageous effects of Ge addition for the improvement in the stability of small record marks was clearly demonstrated by such results.

Figure 12A:
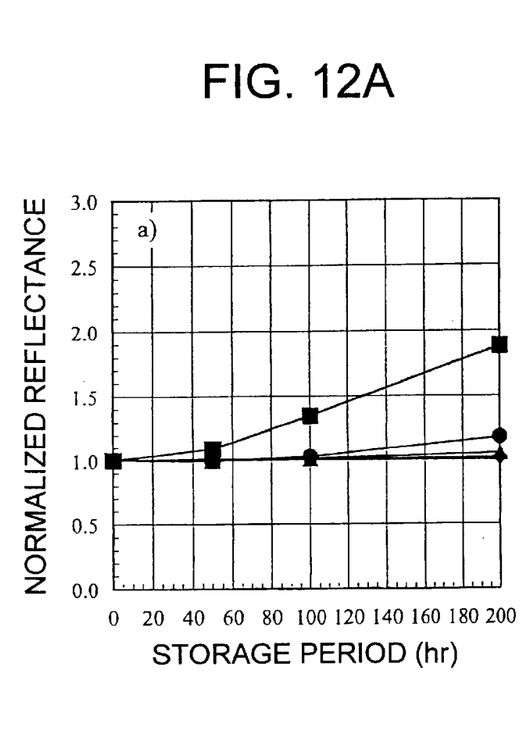
FIGS. 12A and 12B are respectively graphs showing normalized reflectance of the optical recording medium in relation to the storage period of the medium under high temperature, high humidity conditions.
Figure 12B:
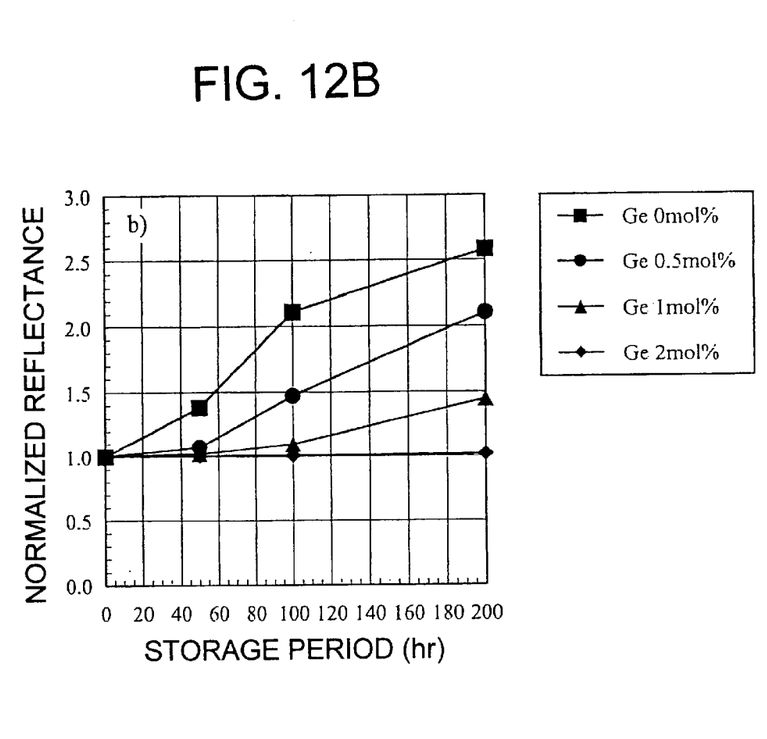

Next, a sample was prepared as in the case of the Sample No. 3 except that the main composition of the recording layer was changed in the formula (I): $Ag_aIn_bSb_cTe_d$ such that a=0.06, b=0.04, c=0.62, and d=0.28, and the amount of the Ge added to the recording layer was varied in the range of from 0 to 2 at %. The samples were formed with the record marks of 300 nm long, and evaluated by storing under high temperature, high humidity conditions as in the case of foregoing Examples. The results are shown in FIGS. 12A and 12B. FIG. 12A shows the results for the case wherein the sample was recorded only once after the initialization of the recording layer. FIG. 12B shows the results for the case wherein the samples were subjected to 1000 overwriting operations after the initialization. The amount of the Ge added is indicated in the figures.

As demonstrated in FIG. 12A, increase in the reflectance during the storage is significantly suppressed by the addition of Ge. In particular, no substantial increase in the reflectance was noted when Ge was added at an amount of 1 at % or more. FIG. 12B demonstrates that no substantial increase in the reflectance is noted when the Ge was added in an amount of 2 at % even when the medium was subjected to 1000 overwriting operations and stored for 200 hours.

Example 4

The recording layer of the optical recording disc sample No. 1 prepared in Example 2 was initialized (crystallized) by a bulk eraser and the sample was placed on an optical recording medium evaluator. The sample was overwritten under the conditions as described below:

Laser beam wavelength: 634 nm

Numerical aperture, NA: 0.6

Linear velocity: 3.5 m/s

Recorded signal: single signal corresponding to the record mark length of 400 nm (=0.38λ/NA) . The recording pulse strategy was of the pattern shown in FIG. 8 wherein:

$T_{top}$: $T_{mp}$: $T_{cl}$=0.5: 0.32 0.5,

Number of multi-pulse=1, $P_w$=14.0 mW, $P_e$=6.0 mW, and $P_b$=0.5 mW.

Figure 3:
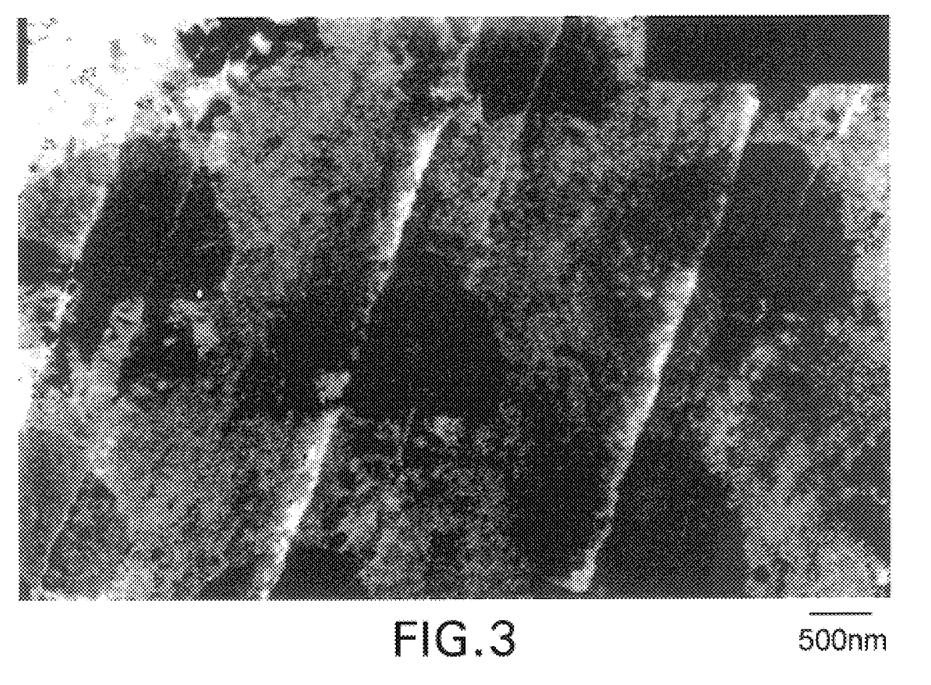
FIG. 3 is another photomicrograph taken by a transmission electron microscope of a recording layer of phase change type containing Ag, In, Sb and Te as its main component. This photograph is presented as a substitute for a diagram showing crystalline structure.
Figure 4:
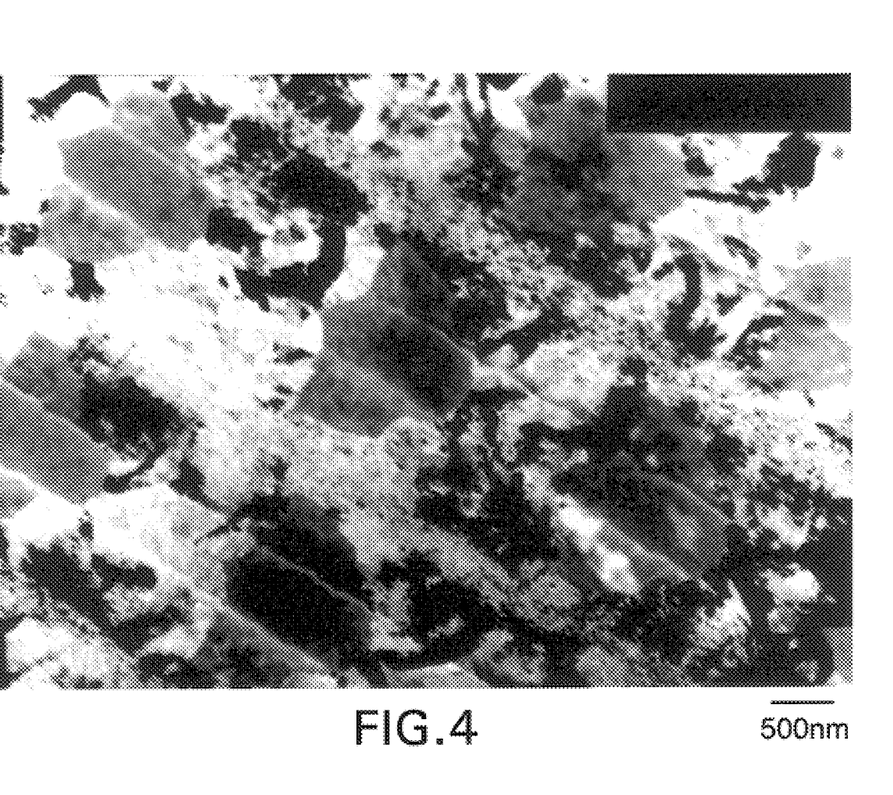
FIG. 4 is another photomicrograph taken by a transmission electron microscope of a recording layer of phase change type containing Ag, In, Sb and Te as its main components. This photograph is presented as a substitute for a diagram showing crystalline structure.

The TEM photomicrograph of the recording layer after recording is shown in FIG. 3. FIG. 4 is the TEM photomicrograph of the recording layer which was recorded by repeating the procedure as described above except that:

$P_w$=13.0 mW, and $P_e$=5. 5 mW.

As demonstrated in FIGS. 3 and 4, adjustment of record mark width with no substantial alteration in the record mark length is enabled by changing the recording power in connection with the erasing power. FIGS. 3 and 4 also demonstrate that a wide recording power margin in forming the record marks of a particular length is realized by such alteration of the recording power in connection with the erasing power.

For comparison purpose, record marks were formed on an optical recording disc sample without utilizing the self erase phenomenon in the rear end portion of the record marks. The optical recording disc sample used was the one having the constitution the same as that of Sample No. 1 except for the thickness of the substrate which was 1.2 mm, and the recording was effected under the conditions:

Laser beam wavelength: 680 nm
Numerical aperture, NA: 0.55
Linear velocity: 1.2 m/s
Recorded signal: single signal corresponding to the record mark length of 400 nm (=0.3λ/NA). The recording waveform was single rectangular pattern with no pulse division wherein:
$P_w$=5.2 mW, and
$P_e$=1.0 mW.

Figure 5:
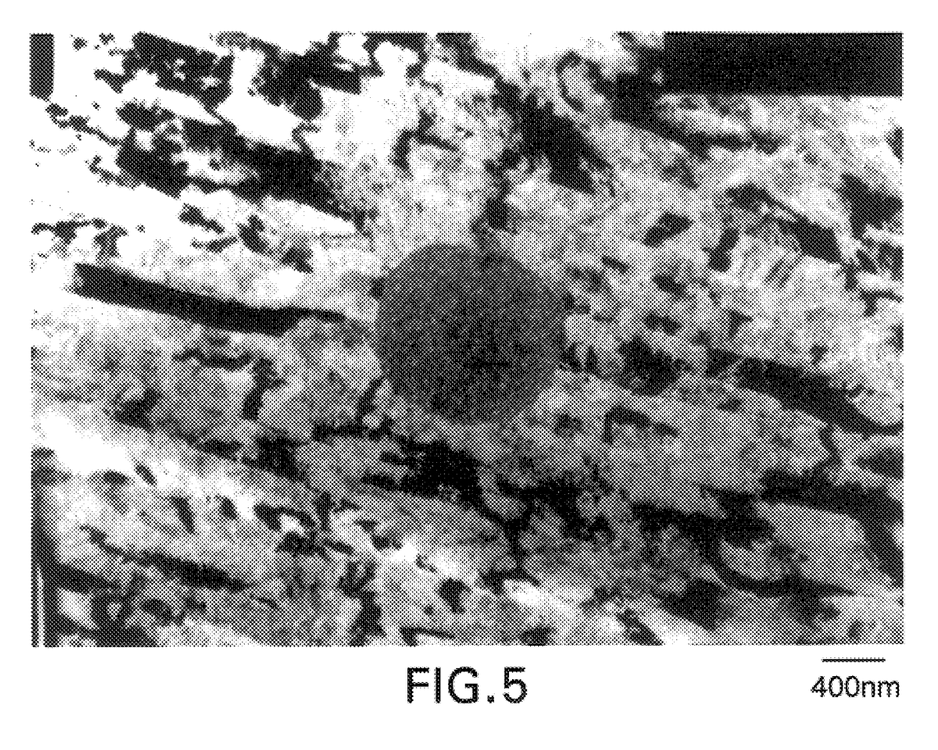
FIG. 5 is another photomicrograph taken by a transmission electron microscope of a recording layer of phase change type containing Ag, In, Sb and Te as its main components. This photograph is presented as a substitute for a diagram showing crystalline structure.
Figure 6:
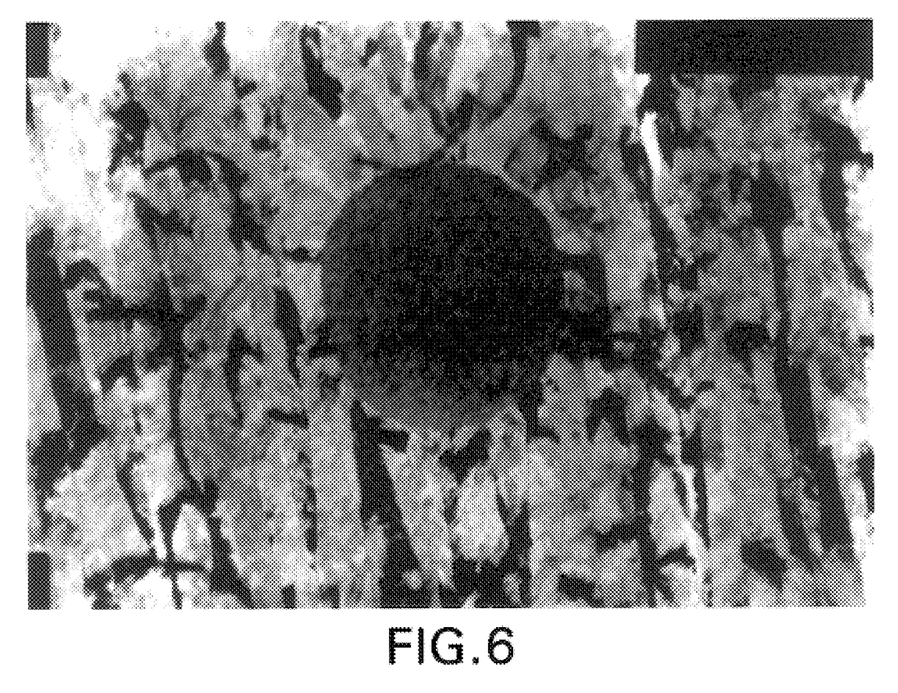
FIG. 6 is another photomicrograph taken by a transmission electron microscope of a recording layer of phase change type containing Ag, In, Sb and Te as its main components. This photograph is presented as a substitute for a diagram showing crystalline structure.

The TEM photomicrograph of the recording layer after recording is shown in FIG. 5. FIG. 6 is the TEM photomicrograph of the recording layer which was recorded by repeating the procedure as described above except that:

$P_w$=6.0 mW, and
$P_a$=1.0 mW.

As demonstrated in FIGS. 5 and 6, in the case when the recording is conducted without utilizing the self erase phenomenon, record mark width is reduced simultaneously with the record mark length when the record mark length is reduced by reducing the recording power. FIGS. 5 and 6 also demonstrate that the recording power margin becomes narrow since the record mark length is affected by the recording power.

It should be noted that $M_W/M_L$ was 1.33 or more in FIG. 3, and 1.2 or more in FIG. 4, while $M_W/M_L$ was 0.83 in FIG. 5, and 0.94 or more in FIG. 6.

In the sample shown in FIG. 3, C/N was 51.0 dB and the jitter was 7.5%, and in the sample shown in FIG. 5, C/N was 46.0 dB and the jitter was 13%. It should be noted that this jitter is the clock jitter obtained by measurement of the readout signal on a time interval analyzer and calculation by the formula:

$$\sigma/Tw\ (\%)$$

when window width is Tw.

For comparison purpose, record marks were formed on the samples prepared as in the case of Example 2 except that the composition of the recording layer was $Ge_2Sb_2Te$. The recording was effected under the conditions:

Laser beam wavelength: 634 nm
Numerical aperture, NA: 0.6
Linear velocity: 3.5 m/s
Recorded signal: single signal corresponding to the record mark length of 440 nm (=0.42λ/NA). The recording waveform was single rectangular pattern with no pulse division wherein:
$P_w$=11.0 mW, and
$P_e$=5.0 mW.

When the recording layer was observed with TEM, the recording marks formed were substantially circular in shape. When the sample was evaluated for the C/N and the jitter, C/N was sufficiently high at 51.5 dB owing to the large record marks formed. The jitter, however, was as high as 13% despite the large record marks and the substantially accurate mark length. In other words, this sample exhibited superior C/N owing to the increase in the area of the record mark compared to the sample which also had the circular record marks (see FIG. 5), while the jitter was not improved. The result as described above reveals that the decrease in jitter is realized by the formation the record marks having the shape as defined by the present invention.

BENEFITS OF THE INVENTION

In the present invention, the record marks formed have predetermined rear end shape, and as a consequence, various problems associated with the high density recording by reducing the record mark length such as decrease in C/N, increase in jitter, and narrowing of recording power margin are suppressed.

Japanese Patent Application No. 368539/1998 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording method for an optical recording medium having a recording layer of a phase change type wherein amorphous record marks are formed in the recording layer by irradiating the medium with a recording beam which is power-modulated between high power, low power, and intermediate power between the high and low powers and which is moving along a recording track in relation to the recording layer, wherein the recording is accomplished by:
irradiating the recording layer with the high power recording beam to thereby melt the recording layer, and
reducing the power of the recording beam to the lower power, and then increasing the power of the recording beam to the intermediate power to thereby rapidly cool a front portion of a molten area for solidification into amorphous phase and to moderately cool a rear portion of the molten area for solidification into crystalline phase,
so that minimum record marks formed are amorphous; and have a shape wherein a forward end side has a convex shape, and a rear end side has a concave shape; and
wherein the minimum record marks are formed such that:

$$M_L \leq 0.4\lambda/NA$$

when $M_L$ is a length of minimum record marks, λ is a wavelength of the recording beam, and NA is a numerical aperture of objective lens of a recording optical system.

2. An optical recording method according to claim 1, wherein the minimum record marks have a tail-like protrusion extending in a direction of the recording track at or near a center of the record mark rear end.

3. An optical recording method according to claim 1, wherein the minimum record marks are formed such that:

$$M_W/M_L > 1$$

wherein $M_W$ is a width of minimum record marks and $M_L$ is the length of minimum record marks.

4. An optical recording method for an optical recording medium having a recording layer of a phase change type wherein amorphous record marks are formed in the recording layer by irradiating the medium with a recording beam which is power-modulated between high power, low power, and intermediate power between the high and low powers and which is moving along a recording track in relation to the recording layer, wherein the recording is accomplished by:
irradiating the recording layer with the high power recording beam to thereby melt the recording layer, and reducing the power of the recording beam to the lower power, and then increasing the power of the recording beam to the intermediate power to thereby rapidly cool a front portion of a molten area for solidification into amorphous phase and to moderately cool a rear portion of the molten area for solidification into crystalline phase, so that minimum record marks formed are amorphous; and have a shape wherein a forward end side has a convex shape, and a rear end side has a concave shape; and wherein the minimum record marks are formed such that:

$$M_W/M_L > 1$$

wherein $M_W$ is a width of minimum record marks and $M_L$ is a length of minimum record marks.

5. An optical recording method according to claim 4, wherein the minimum record marks have a tail-like protrusion extending in a direction of the recording track at or near a center of the record mark rear end.

6. An optical recording method for an optical recording medium having a recording layer of a phase change type wherein amorphous record marks are formed in the recording layer by irradiating the medium with a recording beam which is power-modulated between high power, low power, and intermediate power between the high and low powers and which is moving along a recording track in relation to the recording layer, wherein the recording is accomplished by:
irradiating the recording layer with the high power recording beam to thereby melt the recording layer, and reducing the power of the recording beam to the lower power, and then increasing the power of the recording beam to the intermediate power to thereby rapidly cool a front portion of a molten area for solidification into an amorphous phase and to moderately cool a rear portion of the molten area for solidification into a crystalline phase, so that minimum record marks formed are amorphous; have a shape so a forward end side has a convex shape, and a rear end side has a concave shape; and have a tail-like protrusion extending in a direction of the recording track at or near a center of the record mark rear end.

7. An optical recording method according to claim 6, wherein the minimum record marks are formed such that:

$$M_W/M_L > 1$$

wherein $M_W$ is a width of minimum record marks and $M_L$ is the length of minimum record marks.

8. An optical recording method for an optical recording medium having a recording layer of a phase change type wherein amorphous record marks are formed in the recording layer by irradiating the medium with a recording beam which is power-modulated between high power, low power, and intermediate power between the high and low powers and which is moving along a recording track in relation to the recording layer, wherein the recording is accomplished by:
irradiating the recording layer with the high power recording beam to thereby melt the recording layer, and reducing the power of the recording beam to the lower power, and then increasing the power of the recording beam to the intermediate power to thereby rapidly cool a front portion of a molten area for solidification into amorphous phase and to moderately cool a rear portion of the molten area for solidification into crystalline phase, so that minimum record marks formed are amorphous; a length of the minimum record marks is limited to 350 nm or less; and have a shape wherein a forward end side has a convex shape, and a rear end side has a concave shape.

9. An optical recording method according to claim 8, wherein the minimum record marks have a tail-like protrusion extending in a direction of the recording track at or near a center of the record mark rear end.

10. An optical recording method according to claim 8, wherein minimum record marks are formed such that:

$$M_L \leq 0.4\lambda/NA$$

when $M_L$ is a length of minimum record marks, $\lambda$ is a wavelength of the recording beam, and NA is a numerical aperture of objective lens of a recording optical system.

11. An optical recording method according to claim 8, wherein the minimum recording marks are formed such that:

$$M_W/M_L > 1$$

wherein $M_W$ is a width of the minimum record mark and $M_L$ is a length of the minimum record mark.

12. An optical recording method according to claim 8, wherein the recording layer includes Ag, In, Sb and Te as main components.

13. An optical recording method according to claim 8, wherein the recording layer comprises Ge and/or N as subcomponents.

14. An optical recording method according to claim 8, wherein the recording layer includes Ag, In, Sb and Te as main components and the recording layer comprises Ge and/or N as subcomponents.

* * * * *